United States Patent [19]

Walton et al.

[11] Patent Number: 4,830,297
[45] Date of Patent: May 16, 1989

[54] WINDING FORM ASSEMBLY

[75] Inventors: Ballard E. Walton, Dayton; George A. Gouldbourn, Huber Heights; Alvin C. Banner, Kettering, all of Ohio

[73] Assignee: Statomat-Globe, Inc., Dayton, Ohio

[21] Appl. No.: 125,288

[22] Filed: Nov. 25, 1987

[51] Int. Cl.⁴ .............................................. H02K 15/04
[52] U.S. Cl. ................................. 242/7.05 B; 403/344
[58] Field of Search ............... 242/7.05 R, 7.05 A, 242/7.05 B; 279/34, 84, 67; 269/287; 403/373, 344

[56] References Cited

U.S. PATENT DOCUMENTS

| | | |
|---|---|---|
| 882,253 | 3/1908 | Kunkel . |
| 2,144,477 | 1/1939 | Abrams . |
| 2,348,948 | 5/1944 | Allen . |
| 2,949,554 | 8/1960 | Biddison . |
| 2,969,195 | 1/1961 | Leithe . |
| 3,345,002 | 10/1967 | Peters . |
| 3,673,878 | 7/1972 | Biddison ............ 242/7.05 B X |
| 3,818,570 | 6/1974 | Del Bono ............ 29/205 C |
| 3,876,318 | 4/1975 | Crispell ............ 403/290 |
| 3,892,366 | 7/1975 | Ott ............ 242/7.05 B |
| 4,037,320 | 7/1977 | Wilding ............ 242/7.05 A |
| 4,142,811 | 3/1979 | Burnham ............ 403/290 |
| 4,616,788 | 10/1986 | Finegold ............ 242/7.03 |
| 4,708,297 | 11/1987 | Boers ............ 242/7.05 B |

Primary Examiner—Stuart S. Levy
Assistant Examiner—Katherine Matecki
Attorney, Agent, or Firm—Roger S. Dybvig

[57] ABSTRACT

The mounting plate of a winding form assembly for a flier-type armature winder has a split hub with an axial bore clamped to a bearing at the end of the flier spindle. The mounting plate has spaced segments defined by splits. A clamp screw has a head confined in a bore in the split hub so that, upon loosening the screw, it causes the plate segments to be forced apart, thereby increasing the size of the axial bore so that the plate may easily be removed from the bearing.

9 Claims, 1 Drawing Sheet

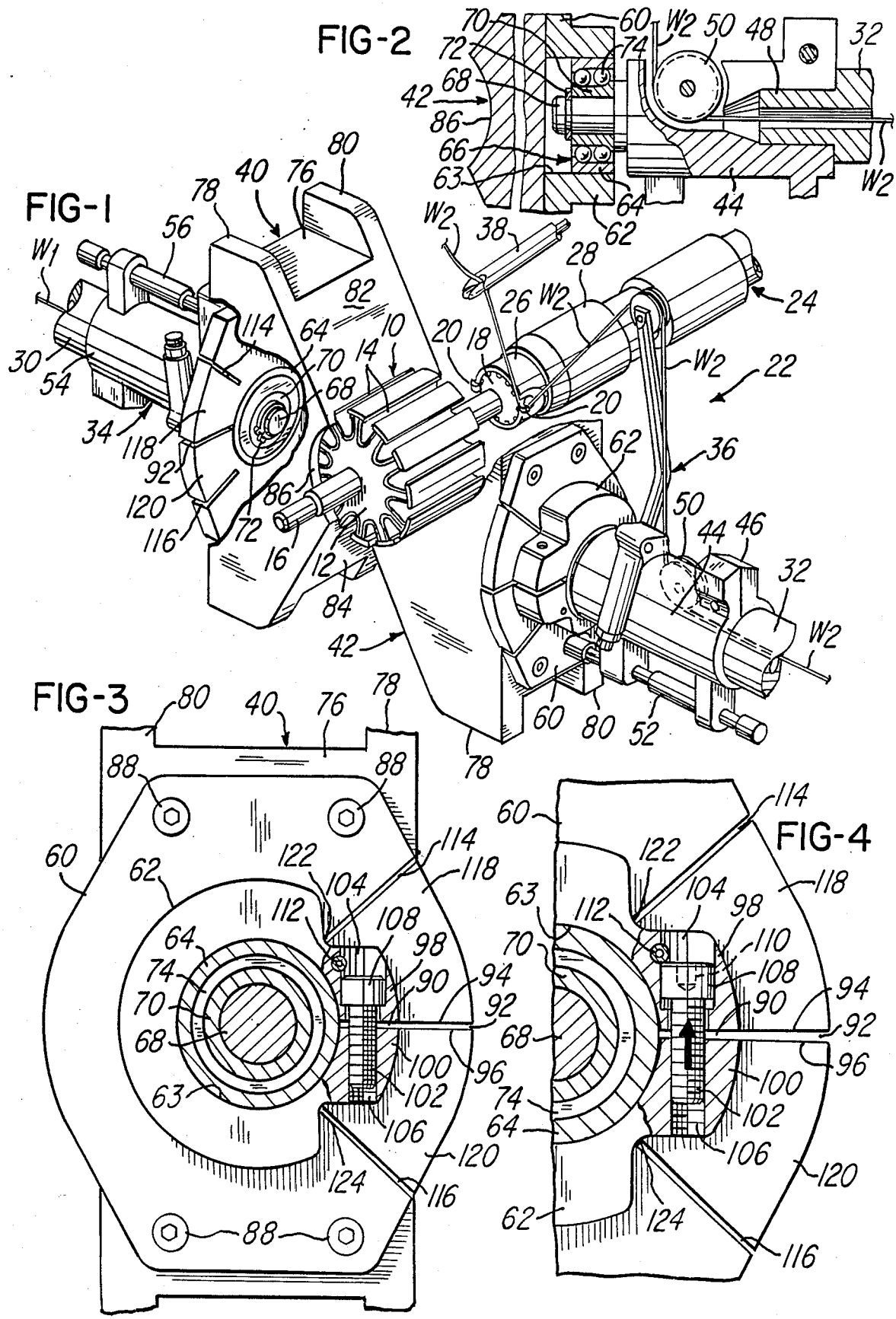

4,830,297

WINDING FORM ASSEMBLY

SUMMARY OF THE INVENTION

This invention relates to a winding form assembly for use with flier-type winding machines for the winding of coils of insulated wire onto cores of rotors of dynamoelectric devices, such as electric motors, and particularly cores having generally axially disposed, radially outwardly opening, coil-receiving slots. The winding forms of this invention are intended primarily for use with double flier winding machines that are most generally used for winding armatures and are typically called "armature winders" but may also be used to wind other cores having radially outwardly opening slots, such as rotating cores carrying field coils. As will become apparent to those skilled in the art, the invention is not so limited and may be used with single or triple flier machines and other types of winding equipment utilizing one or more winding forms.

Typical flier-type armature winding machines used for high-speed production are essentially "dedicated" in the sense that each machine is tooled to wind but a single configuration of armature, or at best a very limited number of armatures. To reliably make lead-wire connections to the commutator of armatures to be wound and to wind acceptable coils, the machine tooling parts must normally be carefully machined to accommodate the specific configuration of the armature to be wound. State-of-the-art double flier machines are entirely satisfactory for most winding applications. However, there are increasing demands upon armature winding machine manufacturers to provide machines that can be rapidly changed over from the capability of producing an armature having one set of parameters to producing an armature having a different set of parameters.

An object of this invention is to provide a flier-type armature winding machine that may be easily and quickly changed over from being tooled to wind armatures having one set of parameters to an armature having a different set of parameters. More particularly, this invention is directed to an improved winding form assembly for an armature winder that may be quickly and easily replaced using only a simple tool by a person having little experience in tooling set-up techniques.

One conventional winding form assembly for a flier-type armature winder comprises a unitary structure including a chuck body mounted on a form mounting plate and affixed to, or one-piece with, a pair of side plates. Both the chuck body and the side plates have highly polished surfaces over which the insulated wires are guided into the core slots. In a double flier winder, two such winding form assemblies separately guide the wires wound into two coils by the two fliers. The two winding form assemblies may also cooperate with one another to provide a chuck that grips the core during winding.

Each form mounting plate is constructed to be clampingly affixed to the outer race of a bearing mounted on the end of a stub shaft at the free end of a flier hub or spindle so that the flier and its spindle are free to rotate relative to the winding form assembly. For this purpose, the mounting plate has a hub in the form of a shaft-gripping, split-ring collar having a centrally located, axially extending bore bounded by a shaft-gripping surface adapted to be clamped to the outer race of a bearing mounted on the stub shaft. The hub is split along a diametral line of the axial bore, the split in the hub being bounded by a pair of mutually opposed, generally parallel end faces. A clamp screw is located in a pair of mutually aligned, screw-receiving bores extending along an axis substantially parallel to a tangent to the axial bore in both directions from the surfaces defining the split in the hub. The clamp screw is rotated in one direction to cause the collar to securely grip the outer bearing race. During assembly, the collar clamp is slipped over the outer race of a bearing and the clamp screw is tightened by rotation to draw the opposed ends of the hub toward one another, thereby narrowing the gap between them and tightening the hub onto the bearing race.

To change over from a conventional winding form assembly configured for use in winding one armature to another winding form assembly for winding a different armature usually requires at least several minutes time and typically requires a service representative of the armature winding machine manufacturer or a specially-trained set-up man who is capable of effecting the changeover.

Conventional winding form hubs may be damaged when an attempt is made to remove winding form hubs from them because it is usually necessary to completely remove the clamping screw from threaded engagement with the threaded bore portion and to then insert a screw driver or other device into the split in the hub to pry the ends of the hub apart. This can be a time-consuming operation which may result in damage to the hub.

In accordance with this invention, the form mounting plate is formed with segments adjacent the ends of the hub which are spaced from adjacent parts of the mounting plate by splits that permit the segments to move in the plane of the mounting plate upon being forced apart. The segments are so constructed that the bearing-receiving bore in the split hub is opened when the segments are forced apart.

Further in accordance with this invention, the split hub is so constructed that rotation of the clamp screw in one direction tightens the clamp and rotation of the clamp screw in the opposite direction not only loosens the clamp but also forces the form mounting plate segments apart. For this purpose, the clamp screw preferably has an enlarged head and abutment means are provided for confining the head in a counterbore in the hub. Such abutment means preferably comprises a spring roll pin or the like lodged in the counter bore so that, upon loosening of the clamp screw, the screw head pushes the roll pin upwardly, causing the mounting plate segments to be effectively jacked apart, whereby they are separated from one another to thereby increase the size of the bore that receives the bearing to enable easy removal of the winding form assembly. Thus, one may completely and easily loosen the hub from the bearing using only a simple wrench.

Other objects and advantages will become apparent from the following description and the drawings.

BRIEF DESCRIPTION OF THE DRAWINGS

FIG. 1 is a simplified, fragmentary perspective view of a portion of a double flier armature winding machine provided with winding forms assemblies made in accordance with the present invention. FIG. 1 also shows an armature located between the winding forms assemblies.

FIG. 2 is a reduced, fragmentary side elevational view, with parts shown in cross section, of the right side flier spindle, flier hub, and winding form assembly of FIG. 1.

FIG. 3 is an enlarged, fragmentary, rear elevational view, partly in cross section, of the left side winding form assembly of FIG. 1 shown clamped to the bearing on the stub shaft.

FIG. 4 is a further enlarged, fragmentary, rear elevational view, partly in cross section, of the left side winding form assembly of FIG. 1 shown as it is being unclamped from the bearing.

DETAILED DESCRIPTION

Referring to FIG. 1, this invention is shown in connection with the winding of an armature, generally designated 10, including an armature core 12 having radially inwardly directed coil-receiving slots 14 mounted on an armature shaft 16. A segmented commutator 18 having plural tangs 20 is mounted upon the same shaft 16. Armature 10 is merely one example of many armatures that may be wound by a flier-type winder.

A portion of a double flier armature winding machine, generally designated 22, used for winding the armature 10 is shown in FIG. 1. Only a limited portion of the machine 22 is illustrated because most of the details of construction of the machine 22 may be entirely conventional and are not part of this invention. Briefly, machine 22 includes an armature rotator, generally designated 24, with which are associated a pair of commutator shield devices, namely an inner shield 26 and an outer shield 28. The purpose of the armature rotator 24 is to position the armature 10 as required to effect the winding of coils thereon and the connection of coil leads to the commutator 18, and the armature rotator 24 has a collet (not shown) for gripping the commutator end of the armature shaft 16. Examples of armature winding machines having armature rotators with collets and commutator shields are shown in U.S. Pat. No. 3,673,878, issued to John M. Biddison on July 4, 1972, and in U.S. Pat. No. 4,633,577, issued to Alvin C. Banner on Jan. 6, 1987.

As will become apparent, this invention could be practiced with armature winding machines which do not have rotators. However, this invention is preferably used with other armature-specific tooling devices, in particular collet assemblies and commutator shield assemblies, which can be rapidly changed to accomodate different armatures. Tooling devices of this type are disclosed in a copending application, Ser. No. 125,289, of Alvin C. Banner, Philip C. Morgan, and Ballard E. Walton, titled Armature Winding Machine With Quick-Change Tooling, filed in the United States Patent and Trademark Office on Nov. 25, 1987.

The armature winding machine 22 further includes left and right side flier spindles 30 and 32, respectively, through which wires, designated $W_1$ and $W_2$, respectively, extend from suitable sources (not shown) of wire under tension. The wires $W_1$ and $W_2$ exit from flier assemblies 34 and 36, respectively, to the armature 10. A pair of wire clamps 38, of which only one is shown in the drawing, clamp the free end of the wire at the end of the winding of one armature until after the commencement of the winding of the next armature. As is well known, during the winding of the armature the flier spindles 30 and 32 are rotatably driven in mutually opposite directions by a suitable motor drive assembly and control circuitry therefor during which time the wires $W_1$ and $W_2$ are drawn through the flier spindles 30 and 32 and wound into the core slots 14. During the winding operations, the wires are guided into the core slots 14 by left and right side winding form assemblies, generally designated 40 and 42, respectively, which will be further described below.

Before proceeding with a discussion of the winding form assemblies 40 and 42, which embody the present invention, it may be noted that FIG. 1 shows the outer shield 28 retracted to expose a pair of commutator tangs 20 through notches in the inner shield 26 so that the wires $W_1$ and $W_2$ can be connected to the tangs 20. The manner in which the tang connections are made are not of importance to this invention and may be in accordance with standard practices in the industry.

With reference to FIGS. 1 and 2, the right side flier assembly 36 is shown to include a flier hub 44 provided with a shaft clamp 46 by which it is mounted on a reduced diameter free end portion 48 of the flier spindle 32. The wire $W_2$ exits from the spindle 32 around an exit pulley 50 rotatably mounted on the flier hub 44. Flier hub 44 carries a spring clutch device 52 designed to maintain the desired orientation of the winding form assembly in a manner well known in the art. The left side flier assembly has a substantially identical flier hub 54 with a spring clutch device 56.

With continued reference to FIGS. 1 and 2, the right side winding form assembly 42 includes a form mounting plate 60 having a hub 62 with a centrally located, axially extending bore 63 clamped to the outer race 64 of a ball bearing assembly, generally designated 66, mounted on a stub shaft 68 extending from the front or free end of the flier hub 44. The bearing 66 has an inner race 70 affixed to the stub shaft 68 by a retaining ring 72 and is separated from the outer race 64 by a set of ball bearings 74.

Each winding form assembly 40 and 42 further comprises a wire guide or chuck body 76 having integral side plates 78 and 80. The chuck body 76 has sloping upper and lower wire-guide surfaces 82 and 84, respectively, joining to a center, concave, core-clamping section along apical edge surfaces designed to extend adjacent the entire axial length of the pairs of core slots 14. The form side plates 78 and 80 also have sloping upper and lower surfaces and also have center portions that straddle the core 12 and are configured to guide the wires $W_1$ and $W_2$ into the ends of the core slots 14 and along the end faces of the core 12. Side plates 78 and 80 may be optionally be affixed to, or formed in one-piece with, the chuck body 76. The chuck body 76 is mounted on the form mounting plate 60 as by plural bolts 88.

The parts of the left side winding form assembly 40 illustrated in the drawing are intended to be identical to the right side winding form assembly 42, except for wire guiding contours which are unique to each armature configuration, and except for the internal tooling parts that may optionally be located within the chuck bodies, which are not illustrated herein. Accordingly, like parts of the two winding form assemblies 40 and 42 are given like reference numbers.

Referring to FIG. 3, the hub 62 of the left side winding form assembly 40 is in the form of a split collar clamp and has a split 90 which extends to an outer edge portion of the hub 62 and lies substantially within a diametral plane of the axial bore 63 of the hub 62. Hub split 90 is coplanar with an extended split portion 92 that extends through the plate 60 to an edge portion thereof. The split 90 and the extended split portion 92 are bounded by mutually confronting, substantially parallel end surfaces 94 and 96 of the mounting plate 60 and the hub 62. The hub 62 accordingly may be said to have mutually confronting upper and lower end portions 98 and 100, respectively. These end portions are interconnected by a clamp screw 102 received in mutually aligned bores 104 and 106 in the upper and lower hub end portions 98 and 100, respectively. Upper bore 104 has a counter bore for receiving the enlarged head 108 of the clamp screw 102 and lower bore 106 is threaded to receive the threaded shank of screw 102. As thus far described, the form mounting plate 60 may be essentially conventional, and it is apparent that one may assemble the hub onto the outer bearing race 64 and then tighten the clamp screw 102 against the shoulder formed at the base of the counter bore in the upper bore 104 to draw the hub ends 98 and 100 toward one another and cause the hub 62 to tightly grip the outer race 64. The clamp screw 102 is tightened by rotating it by means of a suitable wrench (not shown) inserted into a wrenching socket 110 in the clamp screw head 108.

In accordance with this invention, the form mounting plate 60 is also formed with an upper, sloping split 114 and a lower sloping split 116, both of which open to the outer edge of the mounting plate 60. The sloping splits extend to bights 122 and 124 of upper and lower notches or recesses, respectively, in the outer periphery of the hub 62 that are located close to the axial hub bore 63 immediately adjacent the upper and lower hub ends 98 and 100. Each sloping split 114 and 116 is spaced about 45 degrees from the diametral split 92 and extends near to the axial hub bore 63. The splits 92 and 114 define an upper, spoke-like segment 118 therebetween and the splits 92 and 116 define a lower spoke-like segment 120 therebetween. These segments 118 and 120 are connected to other parts of the form mounting plate 60 only near its center so that they may undergo movement in the plane of the mounting plate 60 and thereby substantially reduce the resistance to separation of the hub ends 98 and 100.

The sloping splits 114 and 116 have center planes that intersect the center plane of the diametral split 92 at a point on the center plane of the diametral split 92 on the opposite side of the center axis of the axial hub bore 63 from the diametral split 92. Accordingly, if the segments 118 and 120 are moved apart from one another, such movement will be accompanied by a spreading open of the axial bore 63. Thus, because of the segmented construction of the mounting plate 60, one may easily loosen the hub 62 from the outer bearing race 64.

This invention involves a further modification of the form mounting plates 60 to enable one to quickly and easily spread the mounting plate segments 116 and 118 apart, and thereby render it easy to assemble and disassamble the winding form assemblies 40 and 42 when it is desired to change from one set of winding forms to another. In accordance with this invention, a spring roll pin 112 or other suitable abutment means is lodged in the upper bore 104 above the clamp screw head 108 and extends transversely through an edge of the upper bore 104 so as not to interfere with the use of a wrench to rotate the clamp screw 102 but so as to provide an obstacle to removal of the clamp screw 102. Accordingly, upon loosening of the clamp screw 102, as illustrated in FIG. 4, using only a simple wrench, the confined clamp screw head 108 pushes the roll pin 112 upwardly, causing the mounting plate segments 116 and 118 to be jacked apart and thereby releasing the clamping of the hub 62 to the outer bearing race 64 to enable easy removal by hand of the entire winding form assembly.

To assemble a mounting plate 60, one only need to insert the roll pin 112 after the clamp screw 102 has been assembled in the bores 104 and 106. The mounting plate 60 may be made of any appropriate material. Brass is conventional and preferred.

Although the presently preferred embodiment of this invention has been described, it will be understood that within the purview of this invention various changes may be made within the scope of the appended claims.

Having thus described our invention, we claim:

1. For use with an armature winding machine for winding cores of dynamoelectric devices, said machine being of the type having a flier assembly and a bearing assembly having an outer race for mounting a winding form on the end of the flier assembly, a winding form assembly comprising: a chuck body; and a mounting plate having a hub with an outer periphery and an axially extending bore adapted to be clamped to said outer race, said mounting plate including said hub having a split extending substantially in a plane of a diameter of said bore defined by substantially mutually parallel end faces and separating first and second ends of said hub, a first, threaded, screw-receiving bore extending from one of said faces into said first end of said hub, a second screw-receiving bore extending from the other of said faces extending into said second end of said hub, said second bore having a counterbore opening to the outer periphery of said hub and forming a shoulder in said second bore, a clamp screw having a shank threadedly engaged in said first threaded screw-receiving bore and having a portion including a head extending into said second bore for causing said split to be narrowed if said clamp screw is rotated in a first direction, and abutment means in said second bore engaging said clamp screw for causing said split to be widened if said screw is rotated in a direction opposite to said first direction, said head being confined between said shoulder and said abutment means.

2. The winding form assembly of claim 1 wherein said abutment means comprises a spring roll pin.

3. The winding form assembly of claim 2 wherein said mounting plate has additional splits to reduce the resistance to separation of said hub ends.

4. The winding form assembly of claim 1 wherein said mounting plate has additional splits to reduce the resistance to separation of said hub ends.

5. For use with an armature winding machine for winding cores of dynamoelectric devices, said machine being of the type having a flier assembly and a bearing assembly having an outer race for mounting a winding form on the end of the flier assembly, a winding form assembly comprising: a chuck body; and a mounting plate having a hub with an outer periphery and an axially extending bore adapted to be clamped to said outer race, said mounting plate including said hub having a split extending substantially in a plane of a diameter of said bore defined by substantially mutually parallel end faces and separating first and second ends of said hub, a first, threaded, screw-receiving bore extending from one of said faces into said first end of said hub, a second screw-receiving bore extending from the other of said faces extending into said second end of said hub, a clamp screw having a shank threadedly engaged in said first threaded screw-receiving bore and extending into said second bore for causing said split to be narrowed if said clamp screw is rotated in a first direction, and means in said second bore engaging said clamp screw for causing said split to be widened if said screw is rotated in a direction opposite to said first direction, said mounting plate having additional splits to reduce the resistance to separation of said hub ends.

6. For use with an armature winding machine for winding cores of dynamoelectric devices, said machine being of the type having a flier assembly and a bearing assembly having an outer race for mounting a winding form on the end of the flier assembly, a winding form assembly comprising: a chuck body; a mounting plate having an outer periphery and having a hub with a bore having a center axis extending therethrough adapted to be clamped to said outer race, said mounting plate including said hub having a diametral split extending substantially in a plane of a diameter of said bore defined by substantially mutually parallel end faces and separating first and second ends of said hub, said mounting plate further including a first sloping split angularly spaced from said diametral split in one circumferential direction and opening to the outer periphery of said mounting plate, said diametral split and said first sloping split defining therebetween a first mounting plate segment, a second sloping split angularly spaced from said diametral split in the opposite circumferential direction and opening to the outer periphery of said mounting plate, said diametral split and said second sloping split defining therebetween a second mounting plate segment; and means for forcing said first and second mounting plate segments apart.

7. The winding form assembly of claim 6 wherein said hub has a pair of mutually aligned bores opening to said diametral split, said means for forcing said segments apart comprises a clamp screw in said pair of aligned bores, said clamp screw having a head in one of said aligned bores, and means confining said clamp screw head within said one of said aligned bores.

8. The winding form assembly of claim 6 wherein said sloping splits have center planes that intersect the center plane of said diametral split at a point on the center plane of the diametral split on the opposite side of the center axis of said axially extending bore of said hub bore from said diametral split.

9. The winding form assembly of claim 8 wherein said hub has a pair of mutually aligned bores opening to said diametral split, said means for forcing said segments apart comprises a clamp screw in said pair of aligned bores, said clamp screw having a head in one of said aligned bores, and means confining said clamp screw head within said one of said aligned bores.

* * * * *